United States Patent [19]
Kiiski

[11] Patent Number: 5,323,097
[45] Date of Patent: Jun. 21, 1994

[54] METHOD FOR PRODUCING A SPEED REFERENCE SIGNAL FOR CRANE MOTOR CONTROL

[75] Inventor: Tapani Kiiski, Hyvinkaa, Finland

[73] Assignee: Kone Oy, Helsinki, Finland

[21] Appl. No.: 77,330

[22] Filed: Jun. 16, 1993

Related U.S. Application Data

[63] Continuation of Ser. No. 808,626, Dec. 17, 1991, abandoned.

[30] Foreign Application Priority Data

Dec. 17, 1990 [FI] Finland ................. 906228

[51] Int. Cl.$^5$ ............................. H02P 7/00
[52] U.S. Cl. ................... 318/799; 318/800; 318/276
[58] Field of Search ............ 303/91, 94, 95, 97, 303/98-100, 104-106; 312/276, 278, 268, 270, 271, 362, 365, 369, 798-806, 757, 561; 388/532, 842, 847

[56] References Cited

U.S. PATENT DOCUMENTS

| | | | |
|---|---|---|---|
| 3,593,075 | 7/1971 | Pantelakis | 388/843 |
| 3,636,424 | 1/1972 | Reed | 318/259 |
| 3,670,851 | 6/1972 | Shima | |
| 3,900,821 | 8/1975 | Smith et al. | 318/430 X |
| 4,117,382 | 9/1978 | Yonemoto | 318/163 |
| 4,335,336 | 6/1982 | Filippini | 318/6 |
| 4,520,450 | 5/1985 | Snedden et al. | 318/7 X |
| 4,622,499 | 11/1986 | Squires et al. | 318/254 |
| 4,648,026 | 3/1987 | Petrick | 318/696 X |
| 4,684,865 | 8/1987 | Auger | 318/696 |
| 4,748,555 | 5/1988 | Miyake et al. | 318/632 X |
| 4,801,856 | 1/1989 | Wajima | 318/369 |
| 4,869,610 | 9/1989 | Nishizawa et al. | 318/685 X |
| 4,896,090 | 1/1990 | Balch et al. | 318/52 |
| 4,916,636 | 4/1990 | Torii et al. | 318/568.18 |

FOREIGN PATENT DOCUMENTS 2171863 12/1985 United Kingdom.

Primary Examiner—Jonathan Wysocki
Attorney, Agent, or Firm—Sughrue, Mion, Zinn, Macpeak and Seas

[57] ABSTRACT

A procedure for producing a speed reference signal for a crane motor control when the converter feeding the motor is controlled by means of at least one manually operated controller. To allow the speed reference signal to be changed, the controller has a control position in which the value of the speed reference signal is changed as a function of time. In order to facilitate more accurate manual control of the motor speed, when the speed of the motor is above a predetermined minimum value, the time derivative of the speed reference signal is changed during acceleration of the motor.

5 Claims, 3 Drawing Sheets

FLOW-CHART FOR DETERMINATION OF SPEED REFERENCE

FLOW-CHART FOR DETERMINATION OF SPEED REFERENCE

METHOD FOR PRODUCING A SPEED REFERENCE SIGNAL FOR CRANE MOTOR CONTROL

This is a continuation of application Ser. No. 07/808,626 filed Dec. 17, 1991, now abandoned.

FIELD OF THE INVENTION

The present invention relates to a procedure for forming the speed reference for a crane motor.

BACKGROUND TO THE INVENTION

One known way of controlling the lifting and traversing motions of a crane is to use push-button controllers to give control commands. When the motor driving the crane is powered via a converter, the push-button controllers are used to give the converter a motor speed reference signal, on the basis of which the converter adjusts the motor speed to the desired value. A known system for controlling the motor speed, using push-button controllers, is presented in publication GB A 2171863 (Int. Cl. H02P 7/42), which provides, for each direction of motion, a two-position push-button to determine both the direction and speed of the motion. A first push-button position determines the direction of rotation of the motor and causes acceleration of the motor to a crawling speed (or, when the motor is already running, the maintenance of the speed already reached), while a second position causes the motor to accelerate to the maximum allowed speed. When the button is completely released, the motor speed is reduced at a constant rate of deceleration.

When this type of two-position push-button control is used in connection with a traversing motor, its speed of rotation is accelerated to the maximum in about three seconds. This is generally sufficient for the operator to be able to adjust the motor speed by returning the button to the first position to maintain a desired speed. In the case of the lifting motions, however, the acceleration and deceleration times are shorter, typically 0.5 to 1.5 s. In a practical situation, it is difficult to accurately adjust the speed because it is determined on the basis of a short push-button activation time. In the case of the shortest, 0.5 s acceleration times, this means that if the motor is to be operated at $\frac{1}{3}$ of its maximum speed, for example, the push-button will have to be held at the 2nd step for about 0.2 s and then returned to the 1st step. This time interval is too short to allow the operator to have a direct feel of the speed, in direct contrast to the so-called joystick control, where the joystick position is proportional to the speed.

SUMMARY OF THE INVENTION

An object of the present invention is to provide a method for controlling motor speed by producing a motor speed reference signal in a manner which allows the crane operator to select the desired speed.

According to the present invention, there is provided a procedure for producing the speed reference signal for a crane motor when the converter supplying the motor is controlled by means of at least one controller which, to allow the speed reference signal to be changed, has a control position in which the speed reference is changed as a function of time, wherein at least during acceleration, the time derivative of the speed reference signal of the motor is changed during the control stage following the initial acceleration.

The invention allows the rotational speed of the motor to be easily adjusted while maintaining a good feel for the lifting or lowering speed of the load. The device used by the operator to control the crane motions can still remain relatively simple and no changes to its construction are required. Thus, the invention can be implemented in an economically advantageous manner.

BRIEF DESCRIPTION OF THE DRAWINGS

Embodiments of the invention will now be described, with reference to the accompanying drawings, in which.

DETAILED DESCRIPTION OF THE PREFERRED EMBODIMENTS

Figure 1:
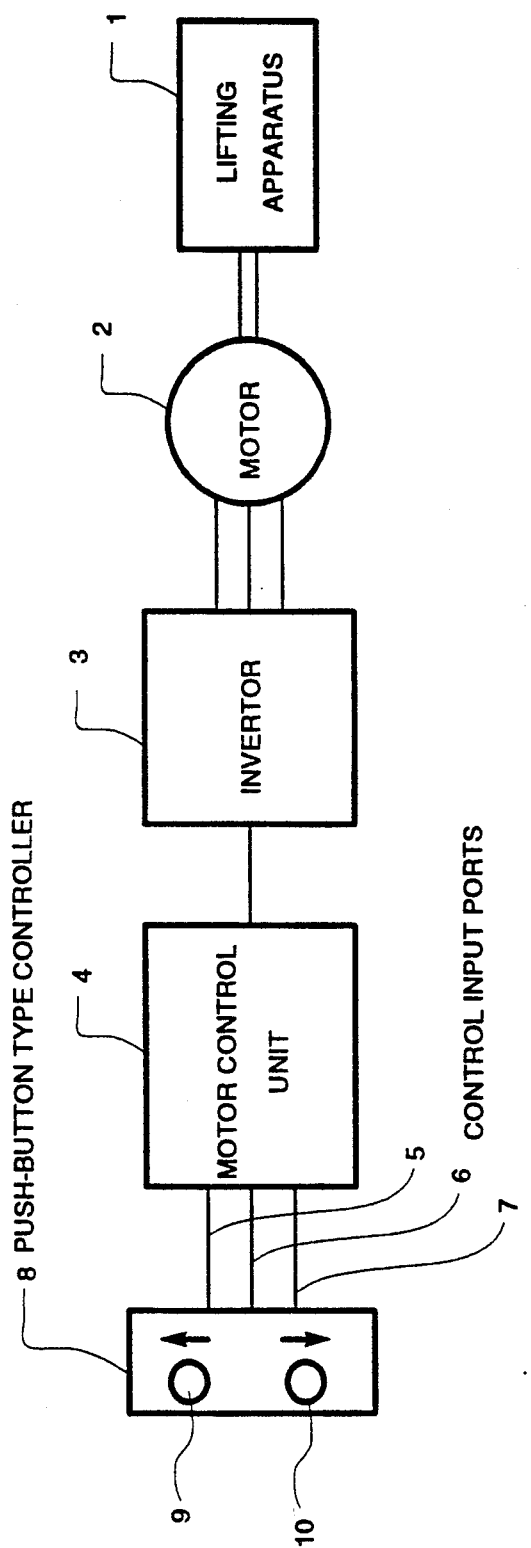
FIG. 1 shows a block diagram representing a speed control system implemented using push-button control according to the present invention.

The block diagram in FIG. 1 represents a crane motor drive in which the lifting apparatus 1 is driven by a motor 2 controlled by an inverter 3. For the purposes of the present invention, the physical implementation of the motor control is irrelevant. It is possible to use virtually any type of motor and control equipment in which a speed reference signal is used to adjust the motor speed to a desired level. The inverter is controlled by a control unit 4, which produces various control signals on the basis of external commands and internal program data. The control unit 4 has three control inputs, of which inputs 5 and 6 are used to determine the direction of the lifting motion, and input 7 is used to determine the positive change in the speed reference signal, i.e. the acceleration. Input control signals are entered by means of a two-position push-button controller 8 provided with separate push-buttons 9 and 10 for the up and down directions. The buttons are so interlocked that they cannot be depressed simultaneously.

The principle of operation of the control apparatus is as follows. To control the lifting apparatus 1, the operator presses button 9 or 10 to its first position. This produces a control signal at control input 5 or 6, thus determining the direction of motion of the lifting apparatus. In the 1st position of the push-button, an initial acceleration takes place, i.e. the motor is accelerated to a certain minimum speed. Pressing the push-button to its second position produces signal at input 7 that causes the control unit to accelerate the motor, by changing the time derivative of the speed reference signal in a manner determined by software. Therefore, no acceleration command can be issued unless one of the direction commands is valid at the same time. The motor speed increases, as long as the push-button is held in the second position, until a predetermined maximum speed is reached. When the push-button is returned to the first position, the control system maintains the speed of the motor. When the push-button is completely released, the control unit 4 causes the motor drive to decelerate in a predetermined manner until zero speed is reached, or until other control commands are given.

Figure 2:
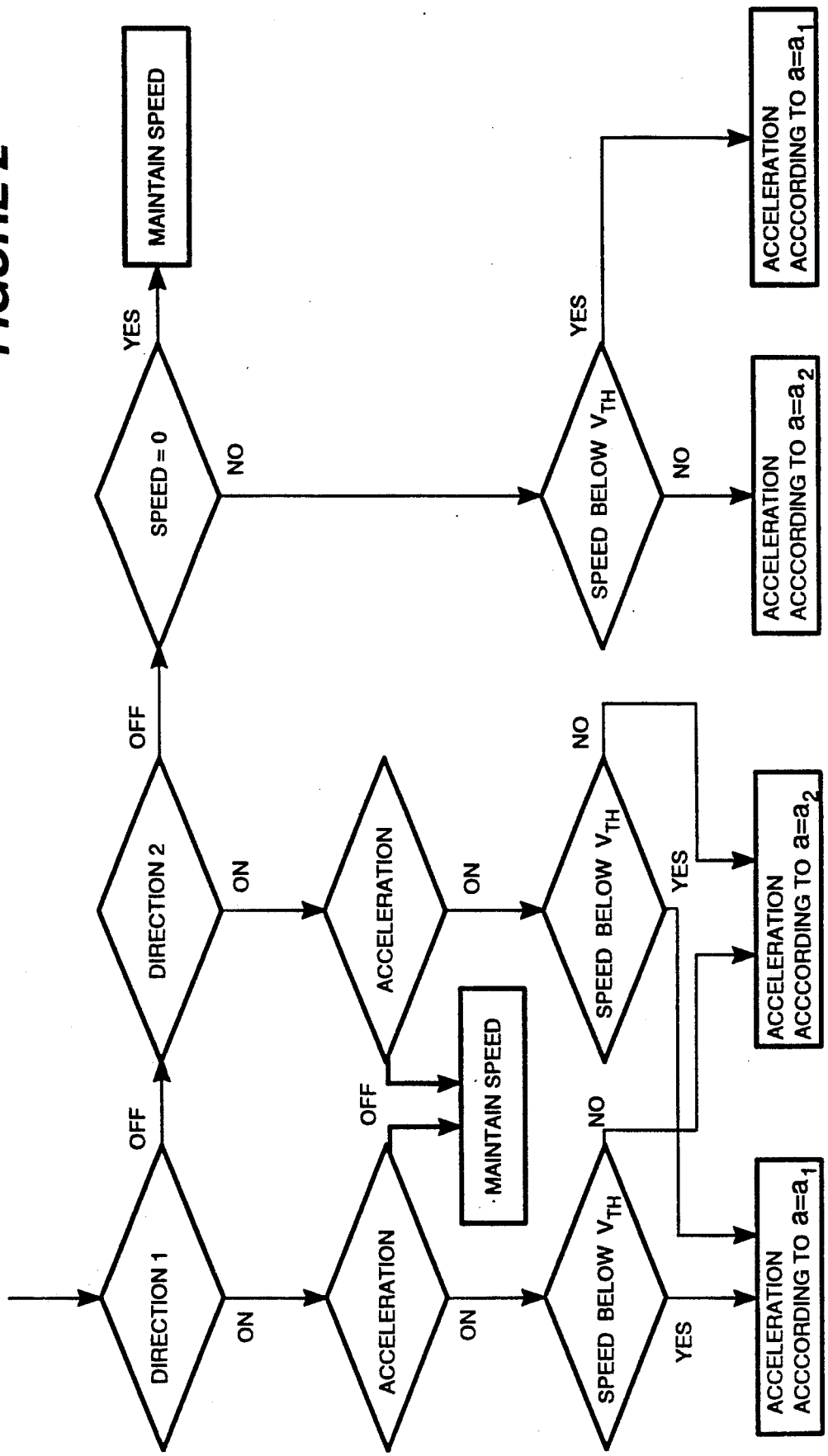
FIG. 2 presents the flow chart of the procedure of the present invention.

FIG. 2 shows a flow chart illustrating the procedure of the invention. When one of the push-buttons is in its 1st position and the direction of the motor thus determined, pressing the button to its second position produces, at the corresponding control input, a control signal for changing the speed reference signal as a function of time. If the speed reference signal is lower than a certain limit $V_{th}$, the motor speed is changed so that the time derivative of the speed equals $a_1$, for which a value has been preselected which is sufficiently small to give the operator enough time to react to the change in the speed and stop accelerating the motion at the desired point. If the speed reference signal is above the limit value due to earlier control inputs, or exceeds the limit value during the current control action, the motor acceleration is increased in a stepwise manner to a higher value $a_2$. The motor acceleration will now remain at the same value for as long as the button is in position 2.

The deceleration of the motor can be controlled in a corresponding manner. For motor speeds above the limit speed $V_{th}$, the deceleration is higher, and for speeds below that, lower. The decelerating values in different speed ranges may have either the same magnitudes or different magnitudes than the corresponding acceleration values.

Figure 3:
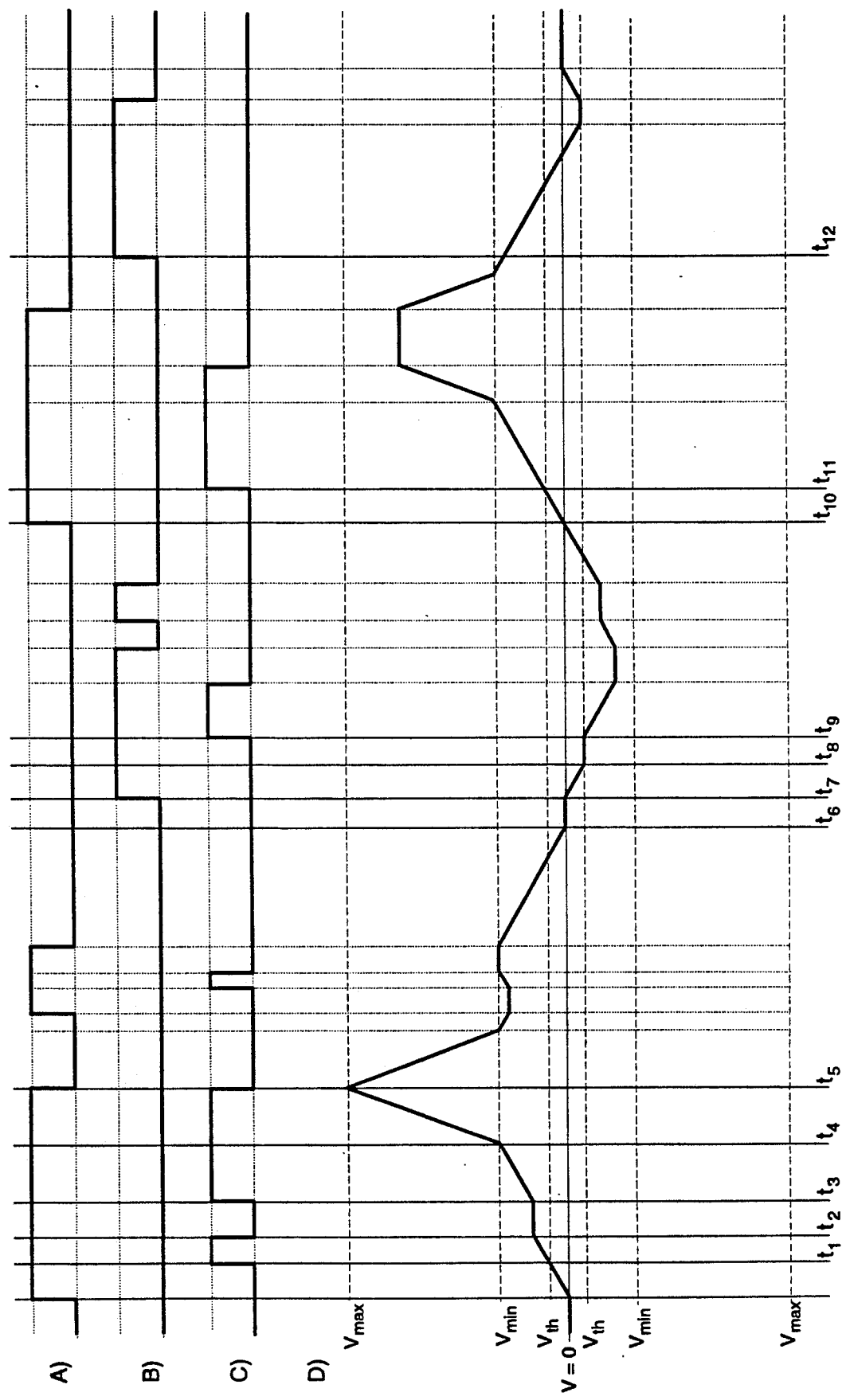
FIGS. 3a–3d present the timing diagram of the control procedure according to the present invention.

FIG. 3 presents the timing diagram of the control procedure of the invention. Curves a-c represent the control signals generated on the basis of the push-button positions. Curve d represents the variations in motor speed as a function of time.

At time $t_0$, the up-button is pressed to position 1, causing the system to perform the initial acceleration. In the time interval $t_1 - t_2$ the motor is accelerated at rate $a_1$, for which in this example a value equal to the initial acceleration has been chosen. In the time interval $t_2 - t_3$ the push-button is again in position 1, so the speed remains constant. During the next acceleration phase, the speed first reaches the value $V_{th}$ at acceleration rate $a_1$, whereupon the acceleration rate changes to $a_2$ and remains at this value until the maximum speed is reached. If the push-button is released, the control unit reduces the motor speed in a corresponding manner until zero speed is reached. In the other direction of motion, the speed control is accomplished according to the same process. In the time interval $t_8 - t_9$ the motor is running at the minimum speed as only a direction command is being input. At instant $t_{12}$ the direction of motion is reversed by an appropriate control signal, causing the control unit first to decelerate the motor to zero speed, in accordance with the normal deceleration program, prior to reversing the direction of the motor.

In the embodiment described, the acceleration and deceleration are changed in a stepwise manner and remain constant between the steps. However, the change of acceleration and deceleration can also be implemented in other ways, for example, as a function of speed. The change can also be implemented as a function of time, in which case the beginning of the time interval is most appropriately counted as starting from the instant when the push-button is pressed to or released from position 2, i.e. from the start of acceleration of deceleration.

The physical implementation of a control circuit that will execute the procedure of the invention, belongs to the normal sphere of expertise of a person skilled in the art, and is therefore not described here in detail.

In the foregoing, the invention has been described by referring to some of its embodiments. However, this presentation should not be regarded as restricting the invention, but the embodiments of the invention may be varied within the scope of the following claims.

I claim:

1. A procedure for producing a speed reference signal for a single, rotary lifting motor of a manually controlled crane in which a converter supplying the motor is controlled by means of at least one manually operated controller which has a control position in which the value of the speed reference signal changes as a function of time, said procedure comprising, when the value of the speed reference signal is changing as a function of time, and the motor is above a predetermined minimum speed, changing the time derivative of the speed reference signal such that when the motor is running at a low speed the motor accelerates or decelerates slowly, and when the motor is running at a high speed the motor accelerates or decelerates quickly.

2. A procedure according to claim 1, in which, when the controllers are inactive, the speed reference signal is reduced to zero, and the time derivative of the speed reference signal is changed during the deceleration of the motor.

3. A procedure according to claim 1, wherein at lower speeds, the speed reference signal time derivative has a smaller absolute value than is used at high speed, and wherein at a given predetermined limit speed, the absolute value of the time derivative is changed in a stepwise manner.

4. A procedure according to claim 1, wherein the time derivative of the speed reference signal is changed as a function of the motor speed.

5. A procedure according to claim 1, wherein the time derivative of the speed reference signal is changed as a function of time, starting from the beginning of a given acceleration or deceleration phase.

* * * * *